United States Patent [19]

Williams, Jr. et al.

[11] 4,344,637
[45] Aug. 17, 1982

[54] HYDRAULIC/PNEUMATIC SUSPENSION SYSTEM FOR SNOWMOBILES

[76] Inventors: Leo M. Williams, Jr., 801 Beeber St., Williamsport, Pa. 17701; Steven L. Dunkle, P.O. Box 405, Salladasburg, Pa. 17740

[21] Appl. No.: 109,028

[22] Filed: Jan. 2, 1980

[51] Int. Cl.³ ............................................. B62B 13/00
[52] U.S. Cl. .................................. 280/21 R; 188/269; 188/317; 267/64.26; 188/321.11; 188/322.41
[58] Field of Search ........................ 180/182, 190, 192; 188/321, 322, 317, 316, 269; 280/16, 21 R, 17, 25, 12; 267/64 R, 64 B, 65 R

[56] References Cited

U.S. PATENT DOCUMENTS

| | | | |
|---|---|---|---|
| 1,189,953 | 7/1916 | Hyne | 188/321 |
| 2,393,559 | 1/1946 | Pappas | 188/317 X |
| 3,006,628 | 10/1961 | Utting | 188/317 X |
| 3,425,707 | 4/1969 | Horiuchi et al. | 280/21 R X |
| 3,659,684 | 5/1972 | Porter | 188/322 |
| 3,726,419 | 4/1973 | Anderson et al. | 188/322 X |
| 3,931,862 | 1/1976 | Cote | 280/25 X |

FOREIGN PATENT DOCUMENTS

| | | | |
|---|---|---|---|
| 754307 | 8/1933 | France | 267/64 R |
| 1382176 | 11/1964 | France | 188/100 S |
| 554983 | 7/1943 | United Kingdom | 188/322 |

*Primary Examiner*—Robert R. Song
*Assistant Examiner*—Donald W. Underwood
*Attorney, Agent, or Firm*—Sughrue, Mion, Zinn, Macpeak & Seas

[57] ABSTRACT

Preferably, a ski or like member contacting the ground suspends a snowmobile frame or chassis via vertical telescoping tubes defining a variable volume chamber. A hollow piston rod fixed to an end cap at one end of one of the telescoping tubes bears at its opposite end and slidable within the other cylinder, a damping piston. The damping piston bears a plurality of orifices for permitting restricted flow of hydraulic liquid to opposite sides of the piston and between chamber sections separated by the damping piston. The hollow rod opens at the end bearing the piston, directly to one chamber section, and bars at least one radial port adjacent its opposite end opening to the other chamber section with the port being closed off by an expandable O-ring functioning as a check valve. A given mass of hydraulic fluid is supplied to the chamber, and the chamber is gas pressurized. The pneumatic/hydraulic suspension system may be employed for supporting the snowmobile skis and may incorporate a steering mechanism as an element of the assembly.

5 Claims, 5 Drawing Figures

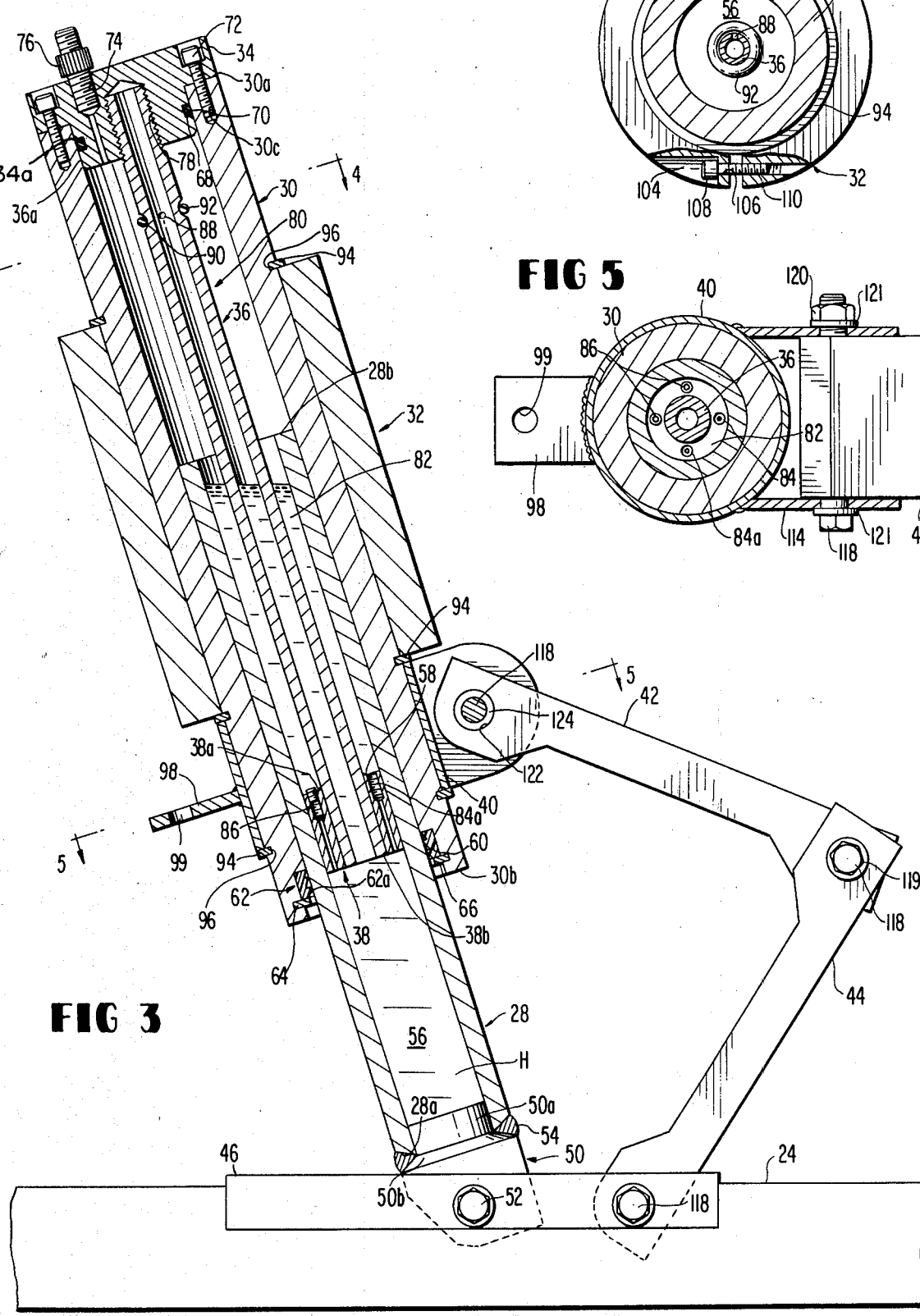

HYDRAULIC/PNEUMATIC SUSPENSION SYSTEM FOR SNOWMOBILES

FIELD OF THE INVENTION

This invention relates to snowmobile suspension systems and, more particularly, to snowmobile suspension systems employing fluid dampening systems.

Suspension systems for snowmobiles, particularly for suspending of snowmobile frame or body by skis, have attempted to provide springs as an element of the suspension system along with a shock dampening mechanism to dampen the movement of the chassis relative to the ski. The spring means may comprise either a leaf spring or a coil spring. The leaf spring, if employed, may have its center mounted to the vehicle chassis or frame, and the ends of the leaf spring mounted to the ski at fore and aft locations on that ski. Attempts have been made to dampen the movement of the frame or chassis experienced during flexing of the leaf spring relative to the underlying ski. Such systems have not worked satisfactorily to either adequately support the snowmobile chassis and frame in terms of spring suspension or to dampen satisfactorily the vibration of the snowmobile frame or chassis with varying load and under varying terrain roughness conditions.

It is, therefore, a primary object of the present invention to provide an improved snowmobile suspension system which provides a true progressive spring rate and whose spring rate may be readily adjusted.

It is a further object of the present invention to provide an improved combined hydraulic and pneumatic snowmobile suspension system for suspending the snowmobile chassis relative to the snowmobile ground contact elements in which the hydraulic/pneumatic system provides both spring suspension and shock dampening, wherein the spring rate of the spring suspension may be readily adjusted by varying the internal oil level, and wherein the pneumatic pressure may be adjusted to preload the "at rest" height of the snowmobile suspension system.

It is a further object of the present invention to provide an improved hydraulic/pneumatic suspension system for a snowmobile in which the dampening rate adjustment may be achieved by varying the viscosity of the hydraulic fluid and/or by way of changing the effective orifice size for a piston movable within the hydraulic fluid.

SUMMARY OF THE INVENTION

While the snowmobile suspension system of the present invention may be applied between the chassis or frame and the engine driven track drive conventionally provided at the rear of the snowmobile, in accordance with the illustrated embodiment of the invention, the improved snowmobile hydraulic/pneumatic suspension system is provided to each of the skis. The suspension system resides between the frame and the ground contact member such as a ski and consists of telescoping hollow suspension tubes defining a variable volume chamber therebetween. A damping system is fixedly borne by one of the suspension tubes and includes a piston slidable within the other tube to separate the chamber into upper and lower sections. The piston bears a number of fixed size orifices which communicate hydraulic liquid to opposite sides of the piston and between the upper and lower chamber sections. Means are provided to gas pressure the given volume of hydraulic liquid borne by the chamber and within which is disposed the damping piston.

A hollow rod which may be fixed at one end to the upper end of the upper tube of the telescoping tubes, bears an annular piston at its lower end of the hollow rod, which piston sealably and slidably engages the wall of the other telescoping tube. At least one upper orifice extends through the hollow rod, adjacent its upper end remote from the damping piston. The hollow rod opens at its lower end to the lower chamber such that upon excessive compression of the telescoping tubes, hydraulic fluid may pass through the hollow rod and enter the upper chamber section through the upper orifice. Preferably, the upper orifices comprise at least one radial port within the hollow rod, and an O-ring seal surrounds the exterior of the hollow rod at the level of the radial port to permit hydraulic fluid to escape radially outward from the interior of the hollow rod during relative compression (retraction) of the telescoping tubes but prevents compressed gas from entering the interior of the hollow rod from the upper chamber during extension of the telescoping tubes.

Preferably, an inner suspension tube is fixed, at its lower end, to the ground support member such as the snowmobile ski, and an outer, telescoping suspension tube is fixed to the snowmobile chassis or frame. Preferably, where the suspension system is employed in suspending the chassis from the ski of the snowmobile, a steering control collar is rotatably mounted on the outer suspension tube for rotation about the tube axis and the steering control collar pivotably mounts one end of an upper steering arm which is articulated by way of a lower steering arm to the ski such that steering is achieved by rotation of the steering control collar about the axis of the telescoping suspension tubes with the inner suspension tube rotating with the collar to facilitate pivoting of the ski for steering purposes. Further, the ski is preferably mounted to the lower end of the inner suspension tube by way of a horizontal bolt to permit the ski to pitch when moving over rolling terrain. The upper and lower steering arms permit such pitching by way of the articulated connection therebetween.

BRIEF DESCRIPTION OF THE DRAWINGS

FIG. 3 is an enlarged vertical sectional view of the portion of the suspension system illustrated in FIG. 2.

FIG. 4 is a transverse sectional view of a portion of the suspension system of FIG. 3 taken about line 4—4.

FIG. 5 is a transverse sectional view of a portion of the suspension system of FIG. 3 taken about line 5—5.

DESCRIPTION OF THE PREFERRED EMBODIMENT

Figure 1:
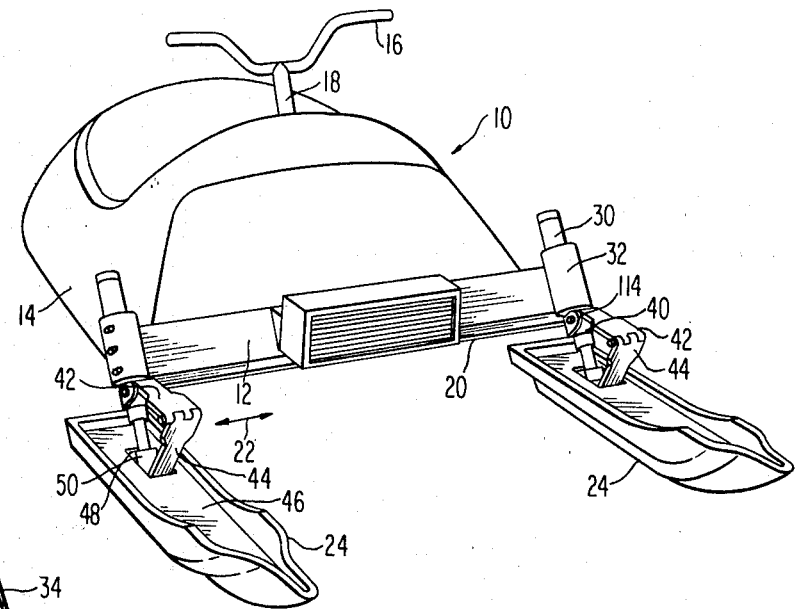
FIG. 1 is a perspective view of a snowmobile constructed in accordance with the present invention in which a pair of skis are supported by separate suspension systems constituting one embodiment of the present invention.

FIG. 1 illustrates a snowmobile indicated generally at 10 which comprises a transverse frame or member 12 extending across the front of a snowmobile chassis 14. Preferably, the chassis is formed as one piece, with the frame 12 integral therewith. The snowmobile conventionally is steered by means of a steering handle bar at 16 which is fixed to a pivotably mounted steering shaft 18, which shaft 18 is mechanically coupled by means (not shown) to a steering cross arm 20, FIG. 1. This permits simultaneous steering of both skis 24 during lateral movement of the cross arm 20 by way of the double headed arrow 22. The present invention is directed to a combined hydraulic/pneumatic suspension system for the snowmobile chassis relative to the ground contact components with the suspension system being shown in the illustrated embodiment as applied to each of two front skis 24 of the snowmobile. The snowmobile 10 is conventionally supported and propelled along the ground at the rear by an engine driven track drive mechanism (not shown), which mechanism can be additionally suspended from the snowmobile frame or chassis by identical suspension systems such as the systems generally shown at 26 and applied to skis 24, with the exception that the suspension systems applied to opposite sides of the track drive mechanism would have no necessity or requirement for the integrated steering components as employed in the suspension systems forming the illustrated embodiment of the present invention.

As illustrated particularly in FIGS. 2 to 5 inclusive, each suspension system 26 comprises as principal components an inner suspension tube indicated generally at 28, an outer suspension tube indicated generally at 30, a suspension support collar indicated generally at 32, an outer suspension tube cap indicated generally at 34, a hollow piston rod indicated generally at 36 and bearing at one end a damping piston 38. Further, for purposes of effecting the steering of the skis 24 by operation of the steering handle bar 18, there are provided as principal components a steering control collar 40 and upper and lower steering arms indicated generally at 42 and 44 and articulated to hydraulic/pneumatic suspension system.

Figure 2:
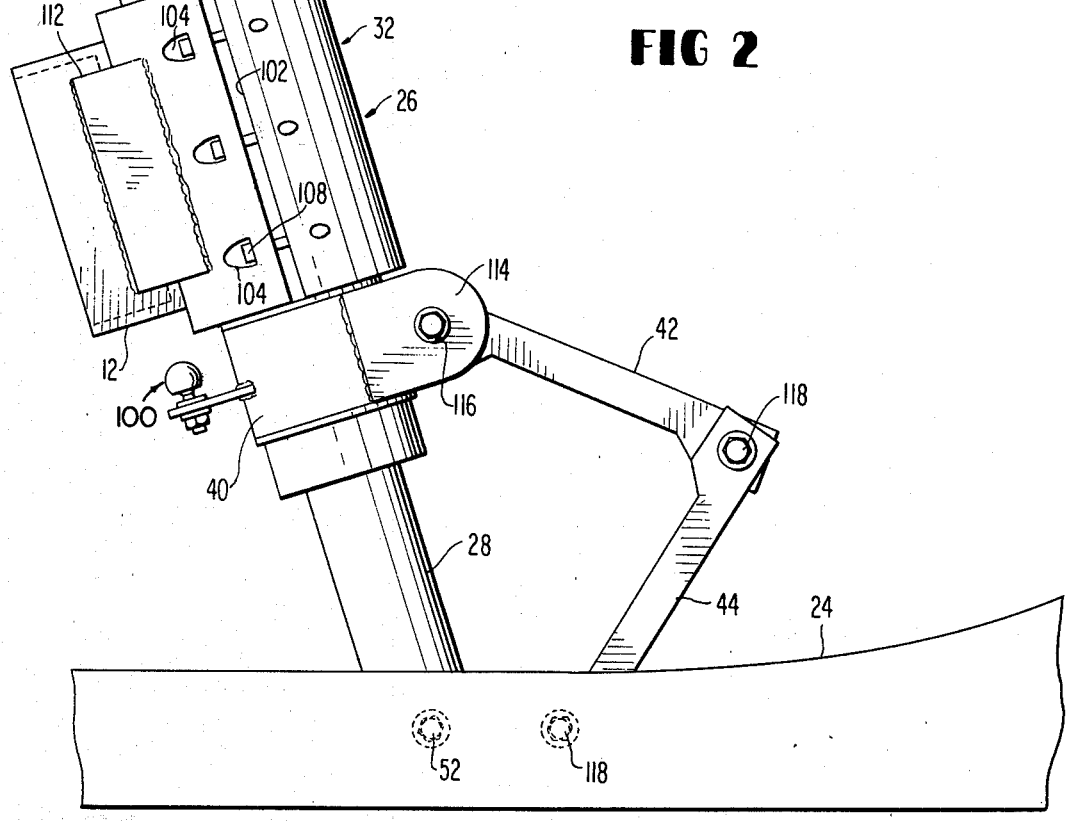
FIG. 2 is a side elevational view of a portion of the snowmobile of FIG. 1 showing the suspension system as applied to one of the skis.

Turning particularly to FIGS. 2 and 3, each ski 24, which may be formed of metal or the like (as are formed the other components of the system), is provided with a transversely extending ski support plate 46 fixed at its lateral edges to opposed sides of the ski and extending over a given longitudinal extent of the ski above the portion in contact with the ground. Within plate 46, there is provided a rectangular opening 48 which permits reception of both the lower end of lower steering arm 44 and also a ski support block indicated generally at 50. The ski support block 50 is pivotably mounted to the ski support plate 46 by means of a bolt 52, thus permitting the ski support block 50 to pivot about a horizontal axis as defined by bolt 52. The ski support block 50 terminates in an integral cylindrical plug 50a which projects within the interior of the lower end of the inner suspension tube 28. The tube 28 is preferably beveled at 28a at its lower end, while the plug 50a joins the main portion of the ski support block 50 by means of a tapered portion 50b, the gap between the end of the inner suspension tube 28 and the ski support block 50 being filled with a weld material 54 such that the inner suspension tube 28 is welded to the ski support block 50 and pivots therewith, while the plug 50a blocks off the lower section of a combined hydraulic/pneumatic chamber 56 formed by the telescoping inner suspension tube 28 and its coacting outer suspension tube 30. The upper end 28b of the inner suspension tube 28 is open so as to receive the coaxially projecting hollow rod 36, which projects downwardly into the inner suspension tube to a predetermined extent as defined by the mass of hydraulic liquid fluid or oil H. The majority of the oil lies beneath the damping piston 38, which piston 38 is welded to and integral with the hollow rod 36, at the lower end of that rod. The damping piston 38 is an annular member having an inner diameter on the order of the outer diameter of the hollow rod 36 and has an outer diameter just slightly less than the inner diameter of the inner suspension tube 28. Thus, with the damping piston 38 being welded at 58 to the lower end of the hollow rod 36, it permits the inner suspension tube 28 to slide on the periphery of the damping piston while maintaining a seal therebetween.

The bottom end 30b of the outer suspension tube 30 is open so as to receive telescopingly the inner suspension tube 28. However, the outer suspension tube 30 is provided with a counterbore at 60 which bears an annular triple lip feather seal member 62 having a serrated inner surface at 62a which rides upon the outer periphery of the inner suspension tube 28. A groove 64 is provided within the counterbore 60 adjacent the lower end 30b of the outer suspension tube which receives a snap ring 66 for holding the annular triple lip feather seal member 62 in place. The inner diameter of the outer suspension tube 30 is slightly larger than the outer diameter of the inner suspension tube 28, so that a sliding fit is achieved between these two telescoping members. Thus, the outer suspension tube 30 may retract or be extended relative to the inner suspension tube 28 during snowmobile travel over the terrain.

The upper end 30a of the outer suspension tube 30 is closed off by an outer suspension tube cap 34 having a T-shaped cross-section and bearing an annular peripheral recess 34a of a diameter on the order of the inner diameter of the outer suspension tube 30. The recess 34a bears an annular groove 68 within its periphery, which groove houses an O-ring seal at 70 such that the outer suspension tube cap 34 is sealably mounted to the upper end of the outer suspension tube 30. This is achieved by means of mounting screws 72 borne by the outer suspension tube cap 34 and received within tapped and threaded holes 30c within the outer suspension tube 30. A tapped and threaded hole 74 within the outer suspension tube cap 34 defines a pressurizing inlet port which is closed off by an air conditioning access fitting 76. When the tube cap 34 is removed, hydraulic liquid or oil H can be poured into the chamber 56 to a level depending upon the desired spring rate for the suspension system, that is, the spring rate is adjusted by varying the internal oil level within the chamber 56. The sole purpose of the access fitting 76 is to introduce pressurized air or gas to the system.

Subsequent to filling the chamber 56 to a desired level with hydraulic fluid H, the system is charged by air pressure through the same pressurizing inlet port 76 to preload the "at rest" height of the chassis suspended by means of the hydraulic/pneumatic suspension system 26 of the present invention. A tapped and threaded hole 78 is provided within a portion of the outer suspension tube cap opening to its lower face, which receives a threaded end 36a of the hollow rod 36 to fixedly mount the hollow rod and thus the damping piston 38 to the outer suspension tube 30. The hollow rod 36 is of a predetermined length such that the piston 38 will not bottom out against plug 50a of the ski support block 50. The progressive spring rate makes it virtually impossible for any type of contact to take place between the inner and outer suspension tubes. Furthermore the steering arms would bottom to each other prior to anything else happening.

The hollow rod 36 and the damping piston 38 constitute a damping control valve assembly indicated generally at 80, and it is the function of the outer suspension tube cap 34 both to contain the hydraulic fluid H and air or other gas under pressure within the system and also to serve as a mount for the damping control valve assembly 80. It also provides easy access for internal adjustment to this damping control valve assembly.

As mentioned previously, the function of the damping piston 38 is to provide a stationary floating hydraulic seal to develop a hydraulic pressure differential between the lower section of chamber 56, below piston 38 and that section above the damping piston 38. The upper chamber section is defined by the portion of the section inner suspension tube 28 extending above the damping piston 38 and the portion of the outer suspension tube 30 between the outer suspension tube cap 34 and the upper end 28b of the inner suspension tube 28. This stationary floating hydraulic seal develops upon movement up or down of the inner suspension tube 28 relative to the outer suspension tube 30. The inner suspension tube 28 has an inner diameter which is quite in excess of the outer diameter of the hollow rod 36, and there exists a cavity or gap 82 between these elements leading to the upper face 38a of the damping piston 38. The piston 38 has longitudinally drilled through the same, a plurality of orifices 84. In the illustrated embodiment, there are four such orifices 84, which constitute small diameter holes drilled longitudinally within the piston member 38 at circumferentially spaced positions. At the upper face 38a of the piston 38, these holes are bored to a larger diameter, tapped and threaded as indicated at 84a. Further, in a selective manner, threaded plugs 86 are threaded to given ones of the tapped and threaded portions 84a thereof so as to seal off given orifices 84. In the illustrated embodiment, see FIGS. 4 and 5, it may be ascertained that only two of the lower orifices are operative to pass hydraulic liquid to opposite sides of the damping piston 38, that is, in each direction regardless of whether the telescoping and inner and outer suspension tubes are expanding or contracting. Thus, the function of the lower orifices 84 are to provide a fixed flow restriction in either direction, and the effective orifice size may be varied by using more or less plugs 86 to close off the individual orifices 84. The function of the threaded removable plugs 86 to allow easy adjustment of the amount of fixed flow restriction, that is, the cross-sectional passage area permitted for the hydraulic fluid in flowing from one side of the upper face 38a to the lower face 38b of the piston 38 and vice versa at that piston, and therefore between the upper and lower chamber sections for chamber 56.

In addition to the lower orifices 84, there is provided at least one upper orifice 88 within the hollow rod 36 just below the outer suspension tube cap 34, FIG. 4. The single illustrated upper orifice 88 is a small diameter hole drilled transversely through the side of the hollow rod 36 and opening to the interior of the hollow rod. Further, the outer periphery of the hollow rod 36 is provided with an annular circumferential groove 90 which intersects the upper orifice 88. Within groove 90 is provided an elastomeric O-ring as at 92 which forms with hole 88 an O-ring check valve during operation of the hydraulic/pneumatic suspension system. That is, any hydraulic fluid H or oil which due to telescoping contraction of the suspension system axially and decrease in the size of chamber 56 will, when that hydraulic fluid H reaches the level of the upper orifice, cause the hydraulic fluid H to exit into the upper section of chamber 56 along with oil escaping through the fixed lower orifices 84.

The function of the upper orifice 88 (or orifices if multiple radial holes are employed) is to provide a fixed flow restriction upon upward compression motion of the inner suspension tube 28. In that respect, it is at the moment when the inner suspension tube 28 is moving upwardly relative to a fixed outer suspension tube 30 (borne by the chassis through the suspension support collar 32), that the hydraulic liquid H reaches the level within the hollow rod 36 of orifice 88 and the O-ring is forced away from the outside of the groove 90 within which it resides so as to leak the hydraulic fluid H into the upper portion of chamber 56 above the upper end 28b of the inner suspension tube 28.

It is the function of the O-ring check valve at 92 to allow fluid flow upon upward (compression) motion while preventing fluid flow from the upper portion of chamber 56 into the interior of the hollow rod 36 during downward extension (rebound) motion of the suspension system.

In the illustrated embodiment of the invention, the outer suspension tube 30 is fixedly positioned on the suspension support collar 32 by means of an upper pair of snap rings 94 received within annular grooves 96 of the outer suspension tube 30. The outer suspension tube 30 is further provided with a third, lower annular groove at 96 which receives yet a third snap ring 94 and which acts to axially locate the steering control collar 40. Collar 40 consists of a sleevelike member which is rotatably mounted on the outer suspension tube 30 but prevented from shifting axially on the assembly by means of two of the snap rings 94. The steering control collar 40 has integrally welded to it, a steering arm as at 98, which arm 98 bears a hole 99 for mounting a steering ball mount assembly 100, FIG. 2, which assembly 100 is linked by means of a socket (not shown) to an end of the steering cross arm 20 so that the steering arms of the individual skis 24 are coupled in tandem to the steering shaft 18, whereby they will rotate in unison for proper steering of the snowmobile during operation.

The function of the suspension support collar 32 is to attach the suspension system on each side to the chassis 14 via frame 12, while allowing easy removal and replacement of worn or damaged parts. The collar 32 is permanently attached to the chassis 14 and the collar itself is an open sided cylinder bearing a slot as at 102 within a side thereof, FIG. 2, while at longitudinally spaced positions, the outer sidewall of the suspension support collar 32 is locally relieved as at 104, and holes are bored therein at 106 so as to permit projection of a threaded tightening screw 108 therethrough. The threaded tightening screws 108 are received within tapped and threaded holes 110 at the corresponding longitudinal positions within the side of the suspension support collar 32 opposite the side bearing the tightening screws 108. Thus, by loosening the tightening screws 108, the suspension support collar effectively enlarges in diameter to permit the outer suspension tube 30 to be removed for replacement, adjustment or the like. In turn, the suspension support collar 32 is welded by way of bracket as at 112 to the frame member 12 which spans transversely across the front of the snowmobile chassis 14 and which is preferably an integral element thereof.

It is the function of the steering control collar 40 to mechanically couple the ski 24 to the chassis steering system as exemplified by the steering cross arm 20 which, in turn, is mechanically coupled to the steering shaft 18 to which it is mechanically linked. In that respect, U-shaped bracket members 114 are welded to the steering control collar 40 on the side opposite the steering arm 98 and at right angles thereto, the bracket members 114 bearing aligned holes as at 116 through which extend a mounting bolt 118 bearing a nut 120 on its opposite end opposite the headed end. The upper and lower steering arms which are mirror images of each other bear cylindrical bolt holes at opposite ends which holes 122 in turn carry stainless steel cylindrical bushings 124 through which project bolts 118. Washers 119 are employed at respective ends of the bolts 118. One end of each upper steering arm 42 is thus bolted to the bracket members 114, that is, being bolted to its steering control collar 40, while the opposite end is articulated by the same bolt and nut type of connection to one end of lower steering arm 44. In turn, the opposite end of each lower steering arm 44 is bolted by way of bolt 118 to the ski support plate 46, in this case just in front of the pivot connection between the ski 24 and the ski support block 50.

In steering of the snowmobile, rotation of the handle bars as mentioned previously, causes the steering cross arm 20 to shift to the right or left, correspondingly, as indicated by double headed arrow 22, FIG. 1. Assuming that in FIGS. 2 and 3, that the collar 40 is rotated counterclockwise looking downwardly from the top of the figures such that the tips of the skis 24 will pivot to the right, FIG. 1. The ski 24 easily accommodates this pivoting movement, while at the same time rotation of the ski through the articulated upper and lower steering arms causes the inner suspension tube 28 to pivot counterclockwise relative to the outer suspension tube 30 which remains fixed due to its being frictionally gripped by way of the suspension support collar 26, which collar, in turn, is welded by way of bracket 112 to the chassis frame 12.

In terms of the combined hydraulic/pneumatic suspension system operation, as mentioned previously, depending upon the terrain to be encountered, the spring rate may be variably adjusted by varying the internal oil level within chamber 56.

The level of oil in each suspension system will be somewhat above the piston 38 and above that oil level is the compressed air whose pressure and volume are varied to determine the initial preload or "at rest" length or height of the suspension system 26, as defined by the telescoping inner and outer suspension tubes.

During travel of the snowmobile, as the telescoping tubes extend and contract, with the compressed air or gas being further compressed or expanded, and the piston movement is dampened by movement of hydraulic fluid H from one side of the piston to the other. As may be appreciated, dampening adjustment may be achieved by varying the viscosity of the hydraulic fluid H or by adding or reducing the number of plugs covering the orifices 84. For instance, the dampening effect can be increased by adding another plug 86 to one of the unplugged orifices as at 84, FIG. 5. Further, dampening is not equal for both extension and retraction of the hydraulic/pneumatic system. This is due to the occurrence of the upper orifice 88 and the O-ring check valve formed by the orifice and the O-ring 92. During compression, oil not only flows upwardly into the upper chamber 56 from beneath the piston through orifices 84, but additionally some oil can escape through the upper orifice 88 to the opposite side of the chamber 56, while to the contrary during extraction of the inner suspension tube 28 relative to the fixed outer suspension tube 30, oil can pass downwardly through those fixed orifices 84 absent plugs 86, but the O-ring 92 prevents any fluid from entering the interior of the hollow rod 36 through that orifice.

By making the adjustments enumerated above, the vehicle may be adapted readily to any terrain conditions with a minimum effort of approximately five minutes required for a complete chanage from one terrain condition to another.

The damping system reduces unwanted oscillation of the ski, thereby maintaining the necessary intimate contact of the ski to ground surface. Overall weight reduction of the hydraulic suspension system versus conventional systems is approximately 15 pounds. The integral rigidity of the system results in firm ski contact with the ground eliminating for the most part ski twist and deflection. While the system is particularly adaptable to snowmobiles for oval racing, the suspension system also provides a much more maneuverable and comfortable vehicle. By lengthening the components, a long travel system can be built for cross country applications. Further, while the illustrated embodiment is shown as adapted to the suspension of the front of the vehicle by way of the skis, and incorporating an integrated steering mechanism, the hydraulic/pneumatic suspension system of the present invention may be directly mounted between the rear of the chassis and the ground engaging drive unit. This would further provide the vehicle with a long travel on the front and rear and giving a balanced control to vehicle operation.

While the invention has been particularly shown and described with reference to a preferred embodiment thereof, it will be understood by those skilled in the art that various changes in form and details may be made therein without departing from the spirit and scope of the invention.

What is claimed is:

1. A snowmobile suspension system for suspending a snowmobile chassis on an underlying ground contact member, said suspension system comprising:

a pair of telescoping hollow suspension tubes defining a variable volume chamber therebetween, said suspension tubes being closed at their non-telescoping ends, means for mounting the closed end of one of said telescoping tubes to said chassis, and for mounting the closed end of said other telescoping tube to said underlying ground contact member, a damping system carried by said telescoping tubes and fixedly borne by one of said tubes, said damping system comprising a hollow rod fixed at one end to the upper end of the vertically upper telescoping hollow suspension tube, said hollow rod opening at its lower end into said variable volume chamber and being positioned within said lower hollow suspension tube and fixedly bearing at its lower end, a damping piston sealably and slidably confronting the inner wall of said lower telescoping hollow suspension tube, first orifice means carried by said damping piston and opening to opposite faces of said piston and to opposite sides of said variable volume chamber, a hydraulic fluid positioned within said variable volume chamber and filling said chamber to a position along said hollow rod, on opposite sides of said piston, means for gas pressuring the balance of said variable volume chamber above the level of said hydraulic fluid such that said damping piston forms a stationary floating hydraulic seal between said upper and lower sections of said variable volume chamber on opposite sides of said piston, and wherein said damping system further comprises second orifice means carried by said hollow rod near its upper end, said second orifice means comprising means for permitting fluid flow from the interior of said hollow rod into said variable volume chamber upper section during compression of said telescoping hollow suspension tubes but preventing fluid from entering the interior of said hollow rod through said second orifice means from said variable volume chamber upper section;

and wherein said second orifice means comprises at least one small diameter hole drilled transversely within said hollow rod and said fluid flow permitting means further comprises a peripheral groove within the outer periphery of said hollow rod at the level of said second orifice means hole, and an elastomeric O-ring disposed within said peripheral groove, overlying said second orifice means hole such that during retraction of said telescoping hollow suspension tubes, fluid may flow from the interior of said hollow rod into the upper chamber section about the elastomeric O-ring, but during extension of said telescoping hollow suspension tubes, fluid is prevented from entering the interior of said hollow rod by said O-ring which functions as a check valve member for said second orifice means hole;

whereby, during contraction of said cylinder and compression of the fluid within said chamber, hydraulic fluid may pass to the upper side of said piston via said first and second orifice means.

2. The snowmobile suspension system as claimed in claim 1, wherein said upper telescoping hollow suspension tube comprises a removable suspension tube cap overlying the end of said upper suspension tube, said suspension tube cap being essentially T-shaped in cross-section and including a reduced diameter portion projecting interiorly of said upper suspension tube, a peripheral groove within the periphery of said projection portion, an O-ring seal member within said peripheral groove, a plurality of screws threadably mounting said suspension tube cap to the upper end of said upper suspension tube, a longitudinal pressurizing inlet port through said outer suspension tube cap, and a threaded pressurizing inlet fitting threadably mounted to said outer suspension tube cap and closing off said pressurizing inlet port such that by removal of said tube cap hydraulic fluid may be supplied to said chamber and air under pressure for gas pressurizing of said hydraulic chamber is introduced through the pressurizing inlet fitting.

3. The snowmobile suspension system as claimed in claim 1, wherein said underlying ground contact member comprises a ski, and each suspension system functions to suspend said chassis at the forward end thereof by way of laterally spaced skis on opposite sides of said snowmobile chassis, and wherein, for each ski, a cylindrical suspension support column is fixedly mounted to said chassis and slidably receives the outer one of said pair of telescoping hollow suspension tubes, said suspension support collar is longitudinally slotted to permit radial expansion and contraction of said suspension support collar, and said suspension support collar comprises a plurality of threaded tightening screws for coupling opposed sides of said suspension support collar at said longitudinal slot, and for adjustably expanding and contracting said suspension support collar about said outer suspension tube to frictionally mount and lock said outer suspension tube to said chassis via said suspension support collar.

4. The snowmobile suspension system as claimed in claim 3, wherein said outer suspension tube comprises first and second longitudinally spaced outer peripheral grooves and snap rings mounted within said grooves at opposite ends of said suspension support collar for locating said suspension support collar on said outer suspension tube.

5. The snowmobile suspension system as claimed in claim 4, further comprising a steering control collar rotatably mounted to said upper telescoping hollow suspension tube for rotation about the axis of said tube but restrained from axial movement with respect thereto, said means for mounting said lower telescoping hollow suspension tube to said ski comprises means for permitting said lower telescoping hollow suspension tube to pivot about an axis transverse to the longitudinal center line of said ski, and wherein said suspension system further comprises a pair of upper and lower steering arms pivotably mounted to each other at one end and at opposite ends respectively to said steering control collar and said ski for pivoting about axes parallel to each other and transverse to the longitudinal center line of said ski, such that steering is effected by rotation of said steering control collar about the axis of said upper telescoping hollow suspension tube with said lower telescoping hollow suspension tube pivoting about its axis during turning of said ski, and wherein said articulated steering arms freely permit the telescoping contraction and expansion of said hollow suspension tubes without interference to steering movement as the snowmobile traverses the terrain.

* * * * *